(12) United States Patent
Doupis et al.

(10) Patent No.: US 11,448,160 B2
(45) Date of Patent: Sep. 20, 2022

(54) HIGH TEMPERATURE GRADIENT GAS MIXER

(71) Applicant: General Electric Company, Schenectady, NY (US)

(72) Inventors: Dimitrios Vasilios Doupis, Avon, CT (US); Paul Chapman, Windsor, CT (US); Alimustapha Tabikh, Kronoberg (SE)

(73) Assignee: General Electric Company, Schenectady, NY (US)

( * ) Notice: Subject to any disclaimer, the term of this patent is extended or adjusted under 35 U.S.C. 154(b) by 417 days.

(21) Appl. No.: 16/579,383

(22) Filed: Sep. 23, 2019

(65) Prior Publication Data
US 2021/0088000 A1  Mar. 25, 2021

(51) Int. Cl.
*F01N 3/05* (2006.01)
*F02K 1/38* (2006.01)
*F01N 13/08* (2010.01)

(52) U.S. Cl.
CPC ............... *F02K 1/386* (2013.01); *F01N 3/05* (2013.01); *F01N 13/082* (2013.01); *F01N 2240/20* (2013.01); *F01N 2270/02* (2013.01)

(58) Field of Classification Search
CPC ...... F01K 1/386; F01D 25/30; F01N 2240/20; F01N 2270/00; F01N 2270/02; F01N 3/05; F01N 3/2821; F01N 13/082; F01N 2330/38; F01N 1/166; F01N 13/10; F02D 9/04
USPC ..................................................... 60/317, 324
See application file for complete search history.

(56) References Cited

U.S. PATENT DOCUMENTS

| 3,092,205 | A | * | 6/1963 | Urmston | F02K 1/48 181/213 |
| 3,592,291 | A | * | 7/1971 | Medawar | F02K 1/38 181/220 |
| 4,226,085 | A | * | 10/1980 | Johnson | F02K 1/04 60/262 |
| 4,929,088 | A | | 5/1990 | Smith | |

(Continued)

FOREIGN PATENT DOCUMENTS

| EP | 3135877 A1 | 3/2017 |
| EP | 3214278 A1 | 9/2017 |

OTHER PUBLICATIONS

EPO Extended European Search Report for EP Application 20196549.8 dated Feb. 16, 2021; 6 pp.

*Primary Examiner* — Thomas P Burke
(74) *Attorney, Agent, or Firm* — Armstrong Teasdale LLP (57) ABSTRACT

A mixing system for a power generation system. The power generation system includes a rotary machine, an exhaust processing system, and a duct system. The rotary machine is configured to produce an exhaust stream. The exhaust processing system is positioned to receive and process the exhaust stream. The duct system is oriented to channel an air stream to the exhaust processing system and to channel the exhaust stream from the rotary machine to the exhaust processing system. The mixing system is within the duct system. The mixing system includes a plurality of supports, a plurality of links extending between at least two of the supports, and at least one wrap circumscribing at least two of the links. The at least one wrap is oriented to change an effective direction of momentum of the exhaust stream and the air stream.

17 Claims, 6 Drawing Sheets

(56) References Cited

U.S. PATENT DOCUMENTS

| | | |
|---|---|---|
| 5,309,946 A | 5/1994 | Ligneul |
| 7,908,845 B2 | 3/2011 | Brown et al. |
| 8,800,276 B2 | 8/2014 | Levin et al. |
| 9,238,199 B1 * | 1/2016 | Martin ............... F01N 3/30 |
| 9,534,525 B2 | 1/2017 | Dalimonte et al. |
| 9,909,421 B2 | 3/2018 | Staskowiak et al. |
| 10,119,449 B2 * | 11/2018 | Boekeloo ............ F02K 1/48 |
| 2009/0019843 A1 | 1/2009 | Levin et al. |
| 2010/0107617 A1 | 5/2010 | Kaiser et al. |
| 2014/0241863 A1 * | 8/2014 | Tardif ................. F02K 1/80 |
| | | 415/145 |
| 2014/0260283 A1 * | 9/2014 | Bouchard ............ F02K 1/48 |
| | | 60/770 |
| 2017/0342911 A1 | 11/2017 | Kulkarni et al. |
| 2019/0353054 A1 * | 11/2019 | Thirumurthy ........ F02C 3/30 |

\* cited by examiner

HIGH TEMPERATURE GRADIENT GAS MIXER

BACKGROUND

The field of the disclosure relates generally to gas turbine engines, and more particularly to high temperature gradient gas mixers used in gas turbine engine exhaust ducts.

Gas turbine engines typically include at least one compressor, at least one burner, and at least one turbine arranged in a serial flow configuration. Typically, the compressor channels compressed air to the burner where it is mixed with a flow of fuel and combusted, creating a high temperature flow of combustion gases that are channeled toward the turbine prior to being exhausted from the gas turbine engine. The exhaust stream from the gas turbine engine may be channeled to additional process equipment, such as, but not limited to, a selective catalytic reduction (SCR) reactor, for further processing. For example, multiple fluid streams, including the gas turbine exhaust stream, may be combined into a single stream that is channeled to the SCR reactor and processed by the SCR reactor. Because, the SCR reaction requires Ammonia, the exhaust stream from the gas turbine engine is typically combined with an air stream and then channeled to the SCR reactor. The temperature of the exhaust stream from the gas turbine engine may be substantially higher than the temperature of the air stream, and, as such, the two streams may stratify within the duct system. Mixers may be used to mix the two streams before the streams enter the SCR reactor.

Because the temperature of the exhaust stream is substantially higher than the temperature of the air stream, thermal gradients may be created in the mixer within the duct system. Generally, known mixers mix vapor streams in an attempt to obtain an even concentration in isothermal flow streams. However, because of the large thermal gradients, thermal stresses may cause the mixer to prematurely fail. Specifically, the stratified exhaust and air streams may create thermal gradients on the upstream side of the mixer, and thermal gradients between the downstream mixed stream and the upstream stratified exhaust and air streams may create thermal gradients between the upstream side and the downstream side of the mixer. Over time, continued exposure to thermal gradients within the duct system may lead to damage and/or failure of the mixer and/or duct system.

BRIEF DESCRIPTION

In one aspect, a mixing system for a power generation system is provided. The power generation system includes a rotary machine, an exhaust processing system, and a duct system. The rotary machine is configured to produce an exhaust stream. The exhaust processing system is positioned to receive and process the exhaust stream. The duct system is oriented to channel an air stream to the exhaust processing system and to channel the exhaust stream from the rotary machine to the exhaust processing system. The mixing system is within the duct system. The mixing system includes a plurality of supports, a plurality of links extending between at least two of the supports, and at least one wrap circumscribing at least two of the links. The at least one wrap is oriented to change an effective direction of momentum of the exhaust stream and the air stream.

In another aspect, a power generation system is provided. The power generation system includes a rotary machine, an exhaust processing system, a duct system, and a mixing system. The rotary machine is configured to produce an exhaust stream. The exhaust processing system is positioned to receive and process the exhaust stream. The duct system is oriented to channel an air stream to said exhaust processing system and to channel the exhaust stream from the rotary machine to the exhaust processing system. The mixing system is positioned within the duct system and includes a plurality of supports, a plurality of links extending between at least two of the supports, and at least one wrap circumscribing at least two of the links. The at least one wrap is oriented to change an effective direction of momentum of the exhaust stream and the air stream.

DETAILED DESCRIPTION

The exemplary mixing systems described herein facilitate thermally mixing two vapor streams within a power generation system. The power generation system includes a rotary machine that generates power and produces an exhaust stream. The power generation system also includes an exhaust processing system that receives and processes the exhaust stream, a duct system that channels the exhaust steam to the exhaust processing system, and a mixing system within the duct system. In the exemplary embodiment, the rotary machine is a gas turbine engine, and the exhaust stream is a mixture of carbon dioxide and other combustion by-products, including nitrogen oxides ($NO_X$). Moreover, in the exemplary embodiment, the exhaust processing system is a selective catalytic reduction (SCR) reactor that facilitates reducing the concentration of $NO_X$ in the exhaust stream. The $NO_X$ reduction reaction only occurs within a predetermined temperature range and requires Ammonia, or an air stream. The duct system channels air into the duct system where it mixes with the exhaust stream. However, because of the large temperature difference between the exhaust stream and the air stream, the exhaust stream and the air stream may otherwise stratify within the duct system and cause the combined stream to have a non-uniform temperature profile that is outside the predetermined temperature range. As described in more detail below, the mixing system facilitates thermally mixing the exhaust stream and the air stream such that the resulting mixed stream has a substantially uniform temperature profile within the predetermined temperature range.

The mixing system includes a plurality of supports that extend from a wall of the duct system, a plurality of links that extend between the supports, and a plurality of wraps that circumscribe at least two of the links. The mixing system is oriented such that each component of the mixing system can expand or contract thermally without exerting mechanical/thermal stress on other components of the mixing system. For example, in the exemplary embodiment, each support includes a plurality of holes and each link includes a body and two pins extending from the body. The links extend though the holes and the body to facilitate preventing the links from sliding out of the holes. As such, a relative position of the links is maintained within the mixing system without the use of rigid attachments. Additionally, the wraps define a hollow interior cavity within the duct system that is oriented such that the exhaust stream and the air stream flow through the hollow interior cavity. The exhaust and air streams absorb thermal energy such that mechanical/thermal stress from the wrap to the links is facilitated to be reduced. As such, the mixing system facilitates reducing mechanical/thermal stress caused by temperature differences within the duct system.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
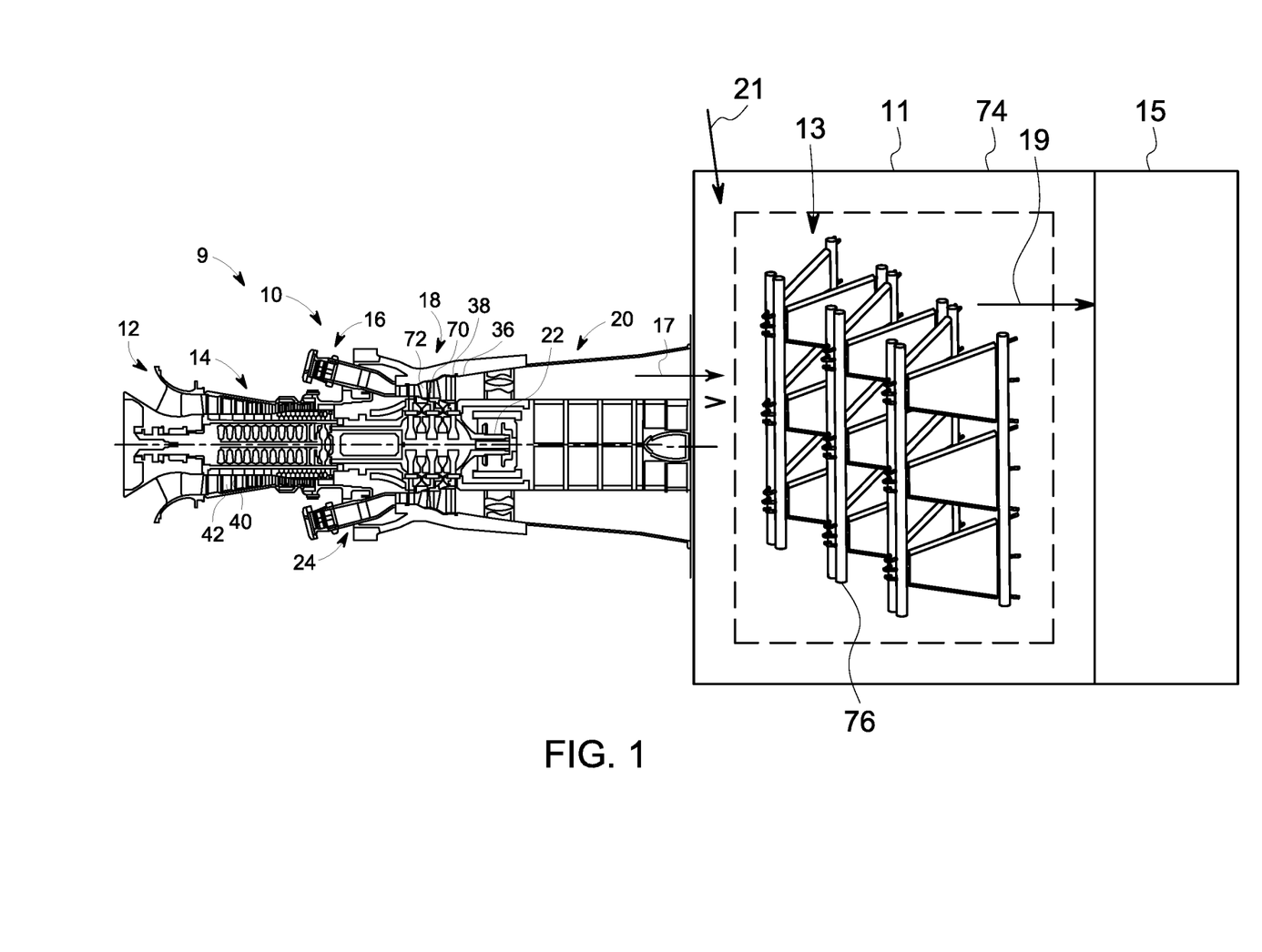
FIG. 1 is a schematic diagram of an exemplary known power generation system.

FIG. 1 is a schematic view of an exemplary known power generation system 9 including a rotary machine 10, a duct system 11, a mixing system 13, and an exhaust processing system 15. In the exemplary embodiment, power generation system 9 generates power with rotary machine 10 by combusting a fuel and generating an exhaust stream 17. Exhaust stream 17 may include $NO_X$, and the exhaust processing system 15 receives and processes exhaust stream 17. More specifically, exhaust processing system 15 facilitates reducing the concentration of $NO_X$ in the exhaust stream. In the exemplary embodiment, exhaust processing system 15 includes a selective catalytic reduction (SCR) reactor that reacts $NO_X$ with a catalyst and a gaseous reductant to produce diatomic nitrogen and water. Duct system 11 channels exhaust stream 17 from rotary machine 10 and an air stream 21 to exhaust processing system 15. Duct system 11 mixes exhaust stream 17 and air stream 21 to produce a mixed stream 19 that is channeled to exhaust processing system 15. Because exhaust stream 17 has a higher temperature than air stream 21, exhaust stream 17 and air stream 21 may otherwise stratify within duct system 11 causing the combined stream to have a non-uniform temperature profile. Mixing system 13 is within duct system 11 and mixes exhaust stream 17 and air stream 21 such that the resulting mixed stream 19 entering exhaust processing system 15 is mixed and has a substantially uniform temperature profile within a predetermined range.

In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A casing 36 at least partially encloses one or more of intake section 12, compressor section 14, combustor section 16, turbine section 18, and exhaust section 20. In alternative embodiments, rotary machine 10 is any machine having rotor blades for which the embodiments of the current disclosure are enabled to function as described herein. In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

Within combustor section 16, compressed air is mixed with fuel and ignited to generate combustion gases that are channeled towards turbine section 18. More specifically, combustor section 16 includes at least one burner 24, in which a fuel, for example, natural gas and/or fuel oil, is injected into the air flow, and the fuel-air mixture is ignited to generate high temperature combustion gases that are channeled towards turbine section 18.

Turbine section 18 converts thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 that extend radially inward from casing 36 to direct combustion gases through rotor blades 70. Rotor shaft 22 may be coupled to a load (not shown) such as, but not limited to, an electrical generator and/or a mechanical drive application. Exhausted combustion gases flow downstream from turbine section 18 into exhaust section 20 and exit exhaust section 20 as exhaust stream 17.

Duct system 11 channels exhaust stream 17 from rotary machine 10 and air stream 21 to exhaust processing system 15. Duct system 11 also mixes exhaust stream 17 and air stream 21 before channeling a resulting mixed stream 19 to exhaust processing system 15. Duct system 11 includes at least one conduit 74 that channels exhaust stream 17 from rotary machine 10 and air stream 21 to exhaust processing system 15. In the exemplary embodiment, a conduit 74 channels exhaust stream 17 from rotary machine 10 and air stream 21 to exhaust processing system 15. Power generation system 9 may include any number of rotary machines 10 and exhaust processing systems 6 that enable power generation system 9 to operate as described herein. In an alternative embodiment, power generation system 9 includes a plurality of rotary machines 10, a single exhaust processing system 15, and a plurality of conduits 74 that channel exhaust stream 17 from each rotary machine 10 to the exhaust processing system 15. In the exemplary embodiment, conduit 74 includes at least one wall 76 that forms conduit 74. More specifically, in the exemplary embodiment, conduit 74 includes four walls 76 that form a substantially square conduit 74. In alternative embodiments, conduit 74 includes a single wall 76 that forms a cylindrically conduit 74.

Exhaust processing system 15 includes a selective catalytic reduction (SCR) reactor that causes $NO_X$ to react with a catalyst and a gaseous reductant to produce diatomic nitrogen and water in a $NO_X$ reduction reaction. In the exemplary embodiment, the gaseous reductant is anhydrous ammonia, aqueous ammonia or urea. However, the gaseous reductant may be any reductant that enables exhaust processing system 15 to operate as described herein. In the exemplary embodiment, the catalyst facilitates increasing a rate of the $NO_X$ reduction reaction and may include ceramic catalysts, base metal catalysts, zeolite catalysts, and/or precious metal catalysts. The catalyst is typically a heterogeneous catalyst, however, the catalyst may be any other catalyst that enables exhaust processing system 15 to operate as described herein.

The $NO_X$ reduction reaction occurs by reacting $NO_X$ with ammonia from the ambient air and the gaseous reductant to produce diatomic nitrogen and water. The oxygen in the $NO_X$ reduction reaction is added to exhaust stream 17 when exhaust stream 17 is mixed with air stream 21 within duct system 11. The gaseous reductant is injected into the mixed stream as the mixed stream enters exhaust processing system 15. The combined stream then contacts the catalyst within exhaust processing system 15 and the $NO_X$ reduction reaction converts the $NO_X$ into diatomic nitrogen and water. The $NO_X$ reduction reaction will occur only within a predetermined temperature range. The predetermined temperature range is determined, at least in part, on the composition of exhaust stream 17 and the catalyst with exhaust processing system 15. The predetermined temperature range is typically between 400° F. and 800° F. Accordingly, the temperature of mixed stream 19 entering exhaust processing system 15 may determine whether the $NO_X$ reduction reaction proceeds at an optimum temperature or whether the $NO_X$ reduction reaction occurs at all. Mixing system 13 mixes exhaust stream 17 and air stream 21 such that a temperature profile of mixed stream 19 is substantially uniform and within the predetermined temperature range. Additionally, mixing system 13 mixes exhaust stream 17 and air stream 21 such that the temperature profile of mixed stream 19 is reduced to protect the catalyst in the SCR reactor.

Figure 2:
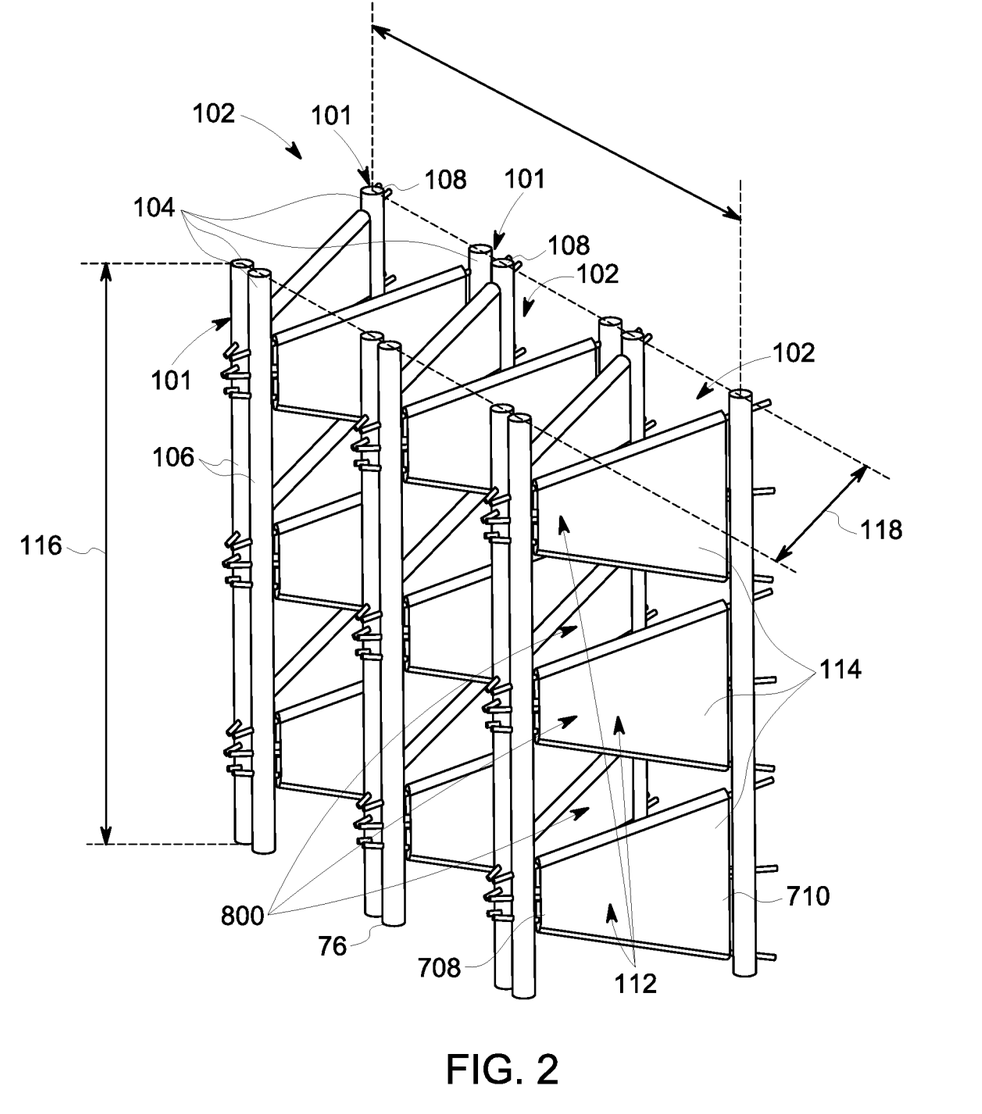
FIG. 2 is a perspective view of an exemplary mixing system that may be used within a duct system of the power generation system shown in FIG. 1.
Figure 3:
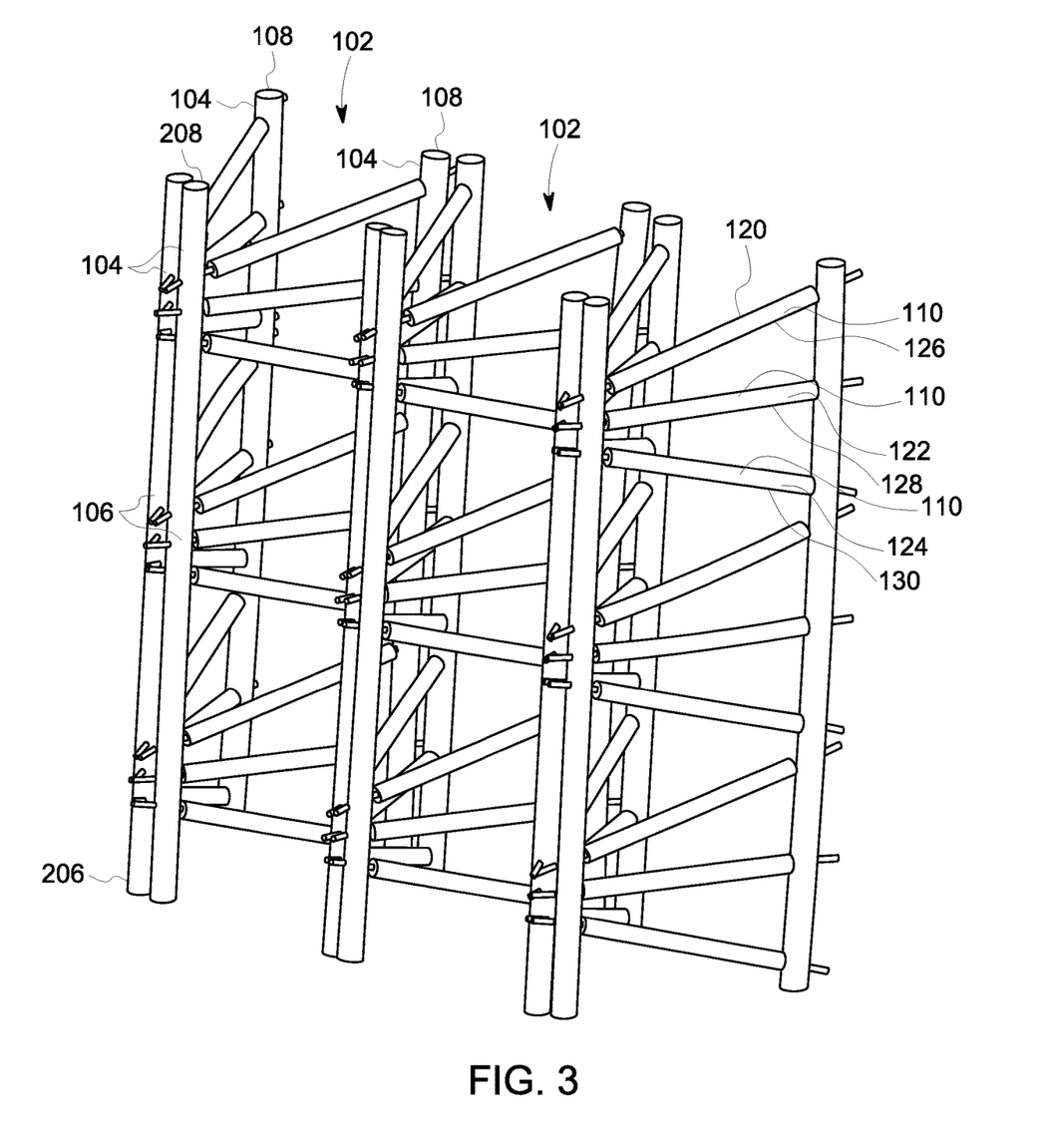
FIG. 3 is another perspective view of the mixing system shown in FIG. 2.

FIG. 2 is a perspective view of mixing system 13. FIG. 3 is a perspective view of mixing system 13 without a plurality of wraps 114. Mixing system 13 includes a plurality of columns 102 arranged in a first orientation within conduit 74. More specifically, in the illustrated embodiment, mixing system 13 includes three columns 102 arranged in a linear orientation across a width of conduit 74. Alternatively, mixing system 13 may include any number of columns 102 arranged in any orientation that enables mixing system 13 to operate as described herein. For example, mixing system 13 may include a plurality of columns 102 arranged in a plurality of linear rows extending across conduit 74.

In the exemplary embodiment, each column 102 includes a plurality of supports 104 arranged in a triangular configuration. More specifically, in the exemplary embodiment, each column 102 includes four supports 104: two upstream supports 106 and two downstream supports 108. Upstream supports 106 are next to each other to form an apex 101 of the triangular configuration. Similarly, downstream supports 106 are spaced apart from each other such that each downstream support 106 forms an apex 101 of the triangular configuration. Each upstream support 106 is coupled to a downstream support 108 via at least one link 110. In the illustrated embodiment, upstream supports 106 are attached to downstream supports 108 by links 110 such that upstream supports 106, downstream supports 108, and links 110 form a triangular shape. In an alternative embodiment, supports 104 may be arranged in a circular configuration, elliptical configuration, parabolic configuration, and/or any other configuration that enables mixing system 13 to operate as described herein.

Each upstream support 106 is attached to each downstream support 108 via a plurality of links 110. The plurality of links 110 are divided into a plurality of wrap sections 112. In the exemplary embodiment, each upstream support 106 is coupled to each downstream support 108 via nine links 110, and the nine links 110 are divided into three wrap sections 112 of three links 110. Each wrap section 112 is covered by a wrap 114. In the exemplary embodiment, each wrap 114 is a sheet of metal wrapped around links 110 of wrap section 112. As such, each wrap 114 forms a solid surface that disturbs mixed stream 19 within conduit 74.

In the exemplary embodiment, supports 106 extend substantially perpendicularly from wall 76 of conduit 74. However, in alternative embodiments, supports 106 may extend from wall 76 at any orientation that enables mixing system 13 (shown in FIG. 1) to operate as described herein. Specifically, supports 106 extend perpendicularly a distance 116 from wall 76. In the exemplary embodiment, distance 116 is about twenty-five feet to about thirty feet. However, distance 116 may be any distance that enables mixing system 13 to operate as described herein. For example, distance 116 may be a percentage of a length of conduit 74. Specifically, in the exemplary embodiment, distance 116 is between about 4 feet to about 40 feet (or about 90% of the length of conduit 74). Accordingly, supports 106 are at a distance 116 that enables mixing system 13 to substantially fill a cross-sectional area of conduit 74 to facilitate disrupting the flow of exhaust stream 17 and air stream 21 within conduit 74. Additionally, downstream supports 108 are positioned a support distance 118 downstream from upstream supports 106 within conduit 74. In the exemplary embodiment, support distance 118 is between about five feet to about twenty feet. However, support distance 118 may be any distance that enables mixing system 13 to operate as described herein.

In the exemplary embodiment, each wrap section 112 includes a first link 120, a second link 122, and a third link 124. Each first link 120 is between upstream support 106 and downstream support 108 and is oriented at a first angle 126 relative to downstream support 108. Each second link 122 is between upstream support 106 and downstream support 108 and is oriented at a second angle 128 relative to downstream support 108. Each third link 124 is between upstream support 106 and downstream support 108 and is oriented at a third angle 130 relative to downstream support 108. In the exemplary embodiment, first angle 126 is between about 10 degrees to about 75 degrees, second angle 128 is between about 0 degrees to about 90 degrees, and third angle 130 is between about 10 degrees to about 75 degrees. Angles 126, 128, and 130 are selected to ensure wrap section 112 forms a triangular shape. Additionally, wrap sections 112 within columns 102 are angled towards each other such that wrap sections 112 form a pyramid structure sized to facilitate disturbing mixed stream 19 within conduit 74.

Figure 4:
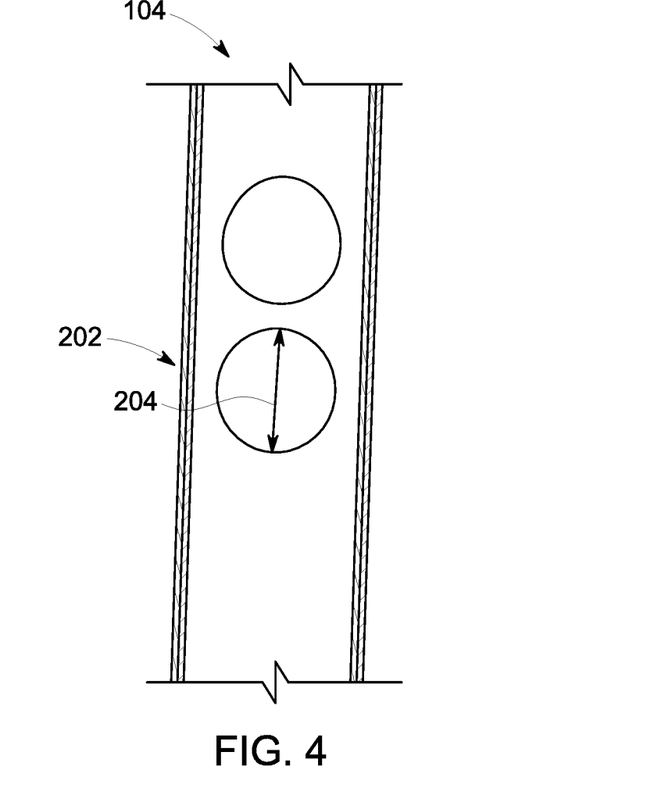
FIG. 4 is a cut away perspective view of exemplary supports that may be used in the mixing system shown in FIGS. 2 and 3.

FIG. 4 is a cut-away perspective view of supports 106. In the exemplary embodiment, supports 106 are hollow tubes that extend substantially perpendicularly from wall 76 of conduit 74. In the exemplary embodiment, supports 106 include a plurality of holes 202 oriented to receive links 110. Holes 202 each have a hole diameter 204. In the exemplary embodiment, hole diameter 204 is between about 0.5 inches to about 3 inches. However, hole diameter 204 may be any size that enables supports 206 to operate as described herein. Specifically, holes 202 are oriented to maintain a position of links 110 without rigid attachments. More specifically, holes 202 are sized to enable links 110 to thermally expand and contract while maintaining the position of links 110 within mixing system 13. As such, holes 202 enable links 110 to float while still maintaining their relative positions and enabling links 110 to thermally expand and contract in response to thermal gradients created by exhaust stream 17, air stream 21, and mixed stream 19. A first end 206 of supports 106 is coupled to wall 76 of conduit 74 while a second end 208 of supports 106 is not coupled to wall 76 of conduit 74. As such, supports 106 are free to expand and contract in response to thermal gradients created by exhaust stream 17 (shown in FIG. 1), air stream 21 (shown in FIG. 1), and/or mixed stream 19 (shown in FIG. 1).

Figure 5:
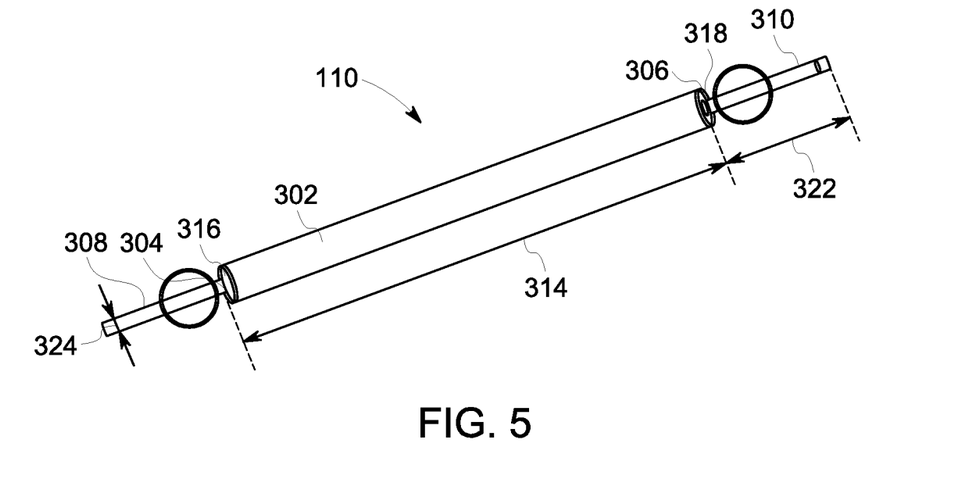
FIG. 5 is a perspective view of an exemplary link that may be used in the mixing system shown in FIGS. 2 and 3.
Figure 6:
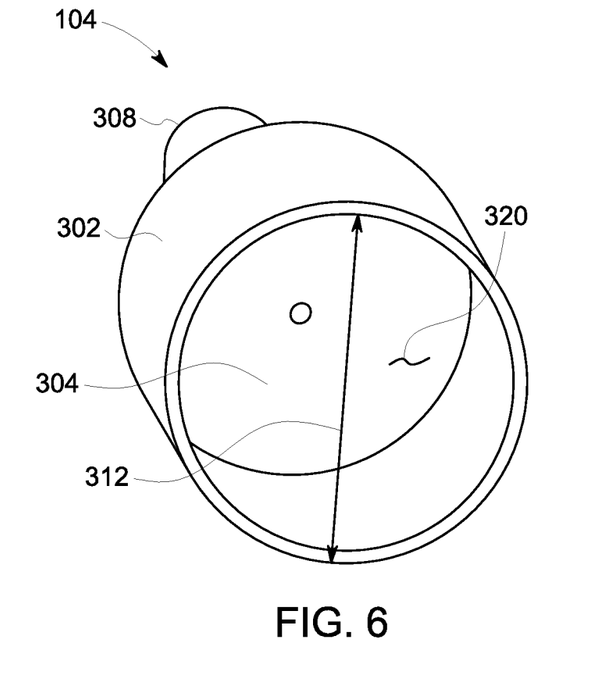
FIG. 6 is a cut away perspective view of the link shown in FIG. 5.

FIG. 5 is a perspective view of links 110. FIG. 6 is a cut away perspective view of links 110. Links 110 each include a body 302, two plugs 304 and 306 on opposite ends of body 302, and two pins 308 and 310 that extend from plugs 304 and 306. In the exemplary embodiment, body 302 is a hollow tube having a diameter 312 and a length 314. In the exemplary embodiment, diameter 312 is between about 0.1 feet to about 1 foot, and length 314 is dependent on spacing between columns 104. However, diameter 312 and/or length 314 may be any length that enables links 110 to operate as described herein. Diameter 312 is larger than hole diameter 204 to prevent links 110 from sliding through holes 202. A first plug 304 is coupled to a first end 316 of body 302, and a second plug 306 is coupled to a second end 318 of body 302. Body 302, first plug 304, and second plug 306 define an cavity 320 of links 110. Cavity 320 facilitates reducing an amount of material require to construct links 110 and reduces the mechanical/thermal stress induced within body 302 by enabling body 302 to thermally expand in a radial direction. Additionally, the thermal stresses induced in length 314 are also reduced because less material expands in response to mechanical/thermal stresses.

A first pin 308 extends from first plug 304, and a second pin 310 extends from second plug 306. Pins 308 and 310 are each oriented substantially perpendicularly to plugs 306 and 306. Pins 308 and 310 are each solid cylindrical pins having a length 322 and a diameter 324. In the exemplary embodiment, length 322 is dependent on a diameter of columns 104, and diameter 324 is dependent on hole diameter 204. However, length 322 and diameter 324 may be any length that enables links 110 to operate as described herein.

Figure 7:
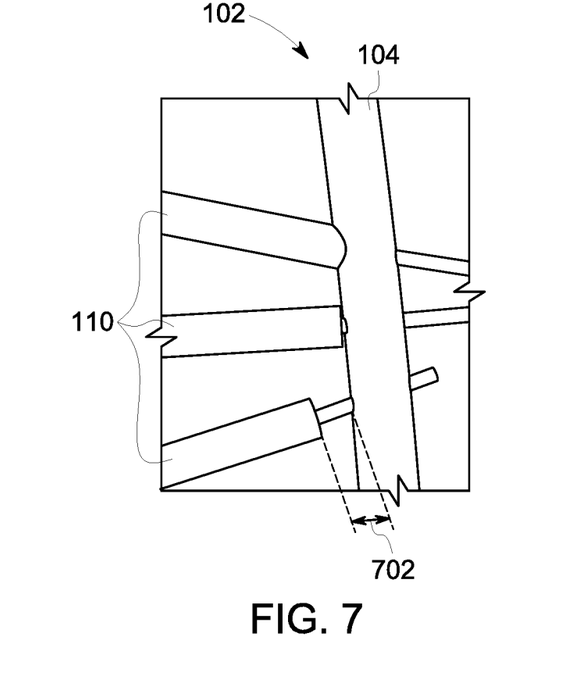
FIG. 7 is a perspective view of a portion of the mixing system shown in FIGS. 2 and 3.

FIG. 7 is a perspective view of a portion of columns 102. Support distance 118, hole diameter 204, diameter 324, diameter 312, length 314, and length 322 are all variably selected to enable mixing system 13 (shown in FIG. 1) to expand and contract in response to thermal gradients created by exhaust stream 17 (shown in FIG. 1), air stream 21 (shown in FIG. 1), and mixed stream 19 (shown in FIG. 1). Specifically, diameter 312 is larger than hole diameter 304, and, as such, prevents body 302 from sliding though holes 202. Accordingly, the size of diameter 312 relative to hole diameter 304 at least partially maintains a position of links 110 relative to upstream supports 106 and downstream supports 108. Additionally, hole diameter 304 is larger than diameter 324, and, as such, allows pins 308, 310 to be inserted into holes 202. Pins 308, 310 prevent links 110 from moving out of holes 202. As such, links 110 are maintain in position by pins 308, 310 extending through holes 202 and body 302 preventing links 110 from sliding through holes 202, not by rigid attachments coupling links 110 to supports 108. Thus, links 110, specifically body 304 and pins 308 and 310, may thermally expand and contract in response to thermal gradients created by exhaust stream 17, air stream 21, and mixed stream 19 without mechanically stressing supports 108. Accordingly, the size of hole diameter 304 relative to diameter 324 at least partially maintains a position of links 110 relative to upstream supports 106 and downstream supports 108.

Moreover, support distance 118, length 314, and length 322 are all selected to allow mixing system 13 to expand and contract in response to thermal gradients created by exhaust stream 17, air stream 21, and mixed stream 19. Specifically, support distance 118 is larger than length 314, and, as such, allows body 302 to thermally expand and contract in a direction of length 314 without exerting mechanical stress on supports 106. That is, support distance 118 and length 314 are selected such that a gap 702 is defined between body 302 and at least one support 108. In the exemplary embodiment, gap 702 is dependent on spacing between columns 104. Gap 702 may be any distance that enables mixing system 13 to operate as described herein. Specifically, support distance 118, length 314, and gap 702 are all selected such that body 302 does not contact and/or mechanically stress at least one support 108 at the maximum expansion of body 302. Moreover, support distance 118, length 314, and length 322 are all selected to maintain the position of links 110 within mixing system 13 when links 110, specifically body 302 and pins 308 and 310, thermally contract. Specifically, support distance 118, length 314, and length 322 are all selected such that pins 308 and 310 extend through holes 202 at the maximum contraction of body 302 and pins 308 and 310, and, as such, links 110 are retained in the position within mixing system 13.

Figure 8:
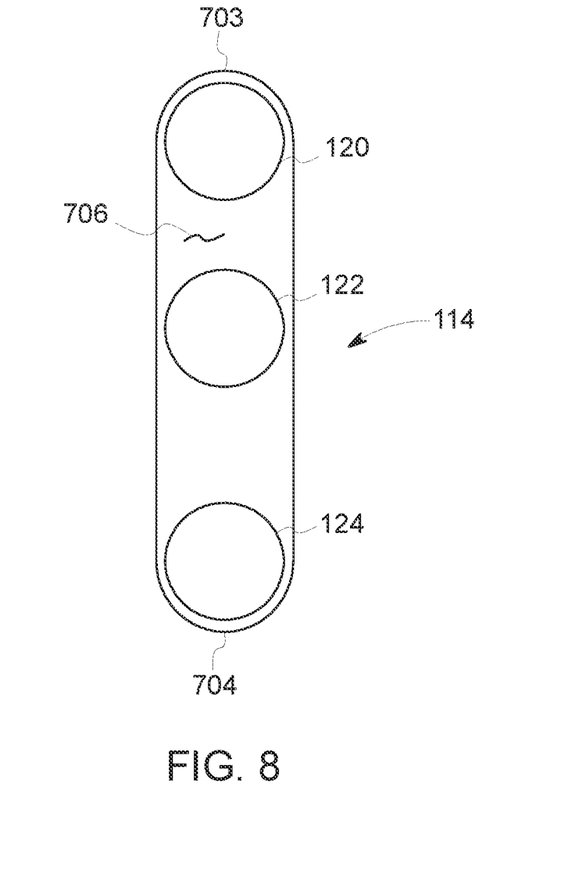
FIG. 8 is a cut away view of an exemplary wrap that may be used in the mixing system shown in FIGS. 2 and 3.

FIG. 8 is a cut away view of wrap 114 wrapped around a plurality of links 110. Wrap 114 is a sheet of metal wrapped around links 110 of wrap section 112. Specifically, in the exemplary embodiment, wrap 114 is a sheet of stainless steel wrapped around links 110. As such, wrap 114 forms a solid surface that disturbs exhaust stream 17 and air stream 21 within conduit 74. As previously discussed, each wrap section 112 includes first link 120, second link 122, and third link 124. In the exemplary embodiment, wrap 114 is wrapped around first link 120 to define a first side or top 703 of wrap section 112, and wrap 114 is wrapped around third link 124 to define a second side or bottom 704 of wrap section 112. Wrap 114 is wrapped around first link 120 and third link 124 to define an inner cavity 706. Second link 122 extend through inner cavity 706 to provide support for wrap 114.

As shown in FIG. 2, first angle 126 and third angle 130 are configured such that wrap section 112 defines a first end or narrow end 708 and a second end or wide end 710. First end 708 and second end 710 are open such that inner cavity 706 is exposed to conduit 74 (shown in FIG. 1) and exhaust stream 17 (shown in FIG. 1), air stream 21 (shown in FIG. 1), and mixed stream 19 are channeled into inner cavity 706. As such, exhaust stream 17, air stream 21, and mixed stream 19 are channeled into inner cavity 706 and absorb thermal energy from wrap 114, providing an insulating layer within inner cavity 706. Because inner cavity 706 is hollow rather than a solid component, and because exhaust stream 17, air stream 21, and mixed stream 19 are capable of expanding out of inner cavity 706, the thermal/mechanical stresses exerted by wrap 114 on links 110 and supports 108 are reduced.

Additionally, in the illustrated embodiment, each wrap section 112 to positioned vertically within column 102 such that first end 708 is upstream of second end 710 and second ends 710 of adjacent wrap sections 112 are adjacent each other. However, wrap sections 112 may be arranged in any configuration that enables mixing system 13 to operate as described herein. As such, the arrangement of wrap sections 112 within column 102 define a plurality of open sections 800 between adjacent wrap sections 112. Wrap sections 112 disrupt air stream 21 and exhaust stream 17, while open sections 800 allow air stream 21 and exhaust stream 17 to flow through mixing system 13.

During operations, exhaust stream 17 produced by rotary machine 10 is channeled into conduit 74. Air stream 21 is subsequently channeled into conduit 74 downstream from rotary machine 10. Air stream 21 and exhaust stream 17 are channeled through conduit 74 to mixing system 13. Mixing system 13 thermally mixes air stream 21 and exhaust stream 17 to produce mixed stream 19 with a temperature profile that is more uniform, i.e., more homogeneous, than the non-uniform temperature profile of streams 21 and 17. Specifically, wrap sections 112 disrupt the flow of air stream 21 and exhaust stream 17 such that mixing vortices are formed within conduit 74 that thermally mix air stream 21 and exhaust stream 17. More specifically, wrap sections 112 are oriented to change the effective direction of momentum of air stream 21 and exhaust stream 17 such that mixing vortices are formed within conduit 74 that thermally mix air stream 21 and exhaust stream 17.

In the illustrated embodiment, columns 102 within mixing system 13 are oriented such that first ends 708 of wrap sections 112 are upstream from second ends 710 of wrap sections 112. In an alternative embodiment, columns 102 may be rotated 90° such that a plurality of wrap sections 112 extend perpendicularly to the flow of air stream 21 and exhaust stream 17. As such, the orientation and configuration of wrap sections 112 may be varied to specific flows of air stream 21 and exhaust stream 17. Furthermore, in the illustrated embodiment, columns 102 include three wrap sections 112. In alternative embodiments, columns 102 may include any number of wrap sections 112 that enable mixing system 13 to operate as described herein, including, without limitation, one, two, four, or more wrap sections 112. Additionally, in the illustrated embodiment, mixing system 13 includes three columns 102. As such, mixing system 13 includes nine wrap sections 112 arranged in a three-by-three square configuration. In alternative embodiments, mixing system 13 may include any number of wrap sections 112 arranged in any configuration that enables mixing system 13 to operate as described herein. For example, mixing system 13 may include three columns 102 which each include two wrap sections 112 arranged in a two-by-three rectangular configuration. The number of wrap sections 112 depends on the mixing requirements of system 13. For example, a system 13 including two wrap sections 112 provides better mixing than systems 13 with more wrap sections 112, but a system 13 including two wrap sections 112 requires a longer mixing length than systems 13 with more wrap sections 112. Accordingly, the number of wrap sections 112 is varied based on the mixing requirements of system 13.

The exemplary mixing systems described herein facilitate thermally mixing two vapor streams within a power generation system. The power generation system includes a rotary machine that generates power and produces an exhaust stream. The power generation system also includes an exhaust processing system that receives and processes the exhaust stream, a duct system that channels the exhaust steam to the exhaust processing system, and a mixing system within the duct system. In the exemplary embodiment, the rotary machine is a gas turbine engine, and the exhaust stream is a mixture of carbon dioxide and other combustion by-products, including nitrogen oxides ($NO_X$). Moreover, in the exemplary embodiment, the exhaust processing system is a selective catalytic reduction (SCR) reactor that facilitates reducing the concentration of $NO_X$ in the exhaust stream. The $NO_X$ reduction reaction only occurs within a predetermined temperature range and requires ammonia, or an air stream. The duct system channels air into the duct system where it mixes with the exhaust stream. However, because of the large temperature difference between the exhaust stream and the air stream, the exhaust stream and the air stream may otherwise stratify within the duct system and cause the combined stream to have a non-uniform temperature profile that is outside the predetermined temperature range. As described in more detail below, the mixing system facilitates thermally mixing the exhaust stream and the air stream such that the resulting mixed stream has a substantially uniform temperature profile within the predetermined temperature range.

The mixing system includes a plurality of supports that extend from a wall of the duct system, a plurality of links that extend between the supports, and a plurality of wraps that circumscribe at least two of the links. The mixing system is oriented such that each component of the mixing system can expand or contract thermally without exerting mechanical/thermal stress on other components of the mixing system. For example, in the exemplary embodiment, each support includes a plurality of holes and each link includes a body and two pins extending from the body. The links extend though the holes and the body to facilitate preventing the links from sliding out of the holes. As such, a relative position of the links is maintained within the mixing system without the use of rigid attachments. Additionally, the wraps define a hollow interior cavity within the duct system that is oriented such that the exhaust stream and the air stream flow through the hollow interior cavity. The exhaust and air streams absorb thermal energy such that mechanical/thermal stress from the wrap to the links is facilitated to be reduced. As such, the mixing system facilitates reducing mechanical/thermal stress caused by temperature differences within the duct system.

The methods, apparatus, and systems described herein are not limited to the specific embodiments described herein. For example, components of each apparatus or system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A mixing system for a power generation system, the power generation system comprises a rotary machine, an exhaust processing system, and a duct system, the rotary machine is configured to produce an exhaust stream, the exhaust processing system is positioned to receive and process the exhaust stream, the duct system is oriented to channel an air stream to the exhaust processing system and to channel the exhaust stream from the rotary machine to the exhaust processing system, the duct system having a width defining a flow path therethrough, said mixing system within the duct system, said mixing system comprising:
    a plurality of supports spaced across the width of the duct system within the flow path, wherein each of said plurality of supports comprises a hollow tube defining a plurality of holes extending through said hollow tube;
    a plurality of links extending between at least two of said supports, wherein each of said links comprises a body and two pins extending from said body, and each of said pins is sized to extend through a respective one of said plurality of holes; and
    at least one wrap circumscribing at least two of said links within said flow path, wherein said at least one wrap is oriented to change an effective direction of momentum of the exhaust stream and the air stream.

2. The mixing system of claim 1, wherein said body has a body diameter and said plurality of holes each have a hole diameter, wherein said body diameter is larger than said hole diameter such that a position of said plurality of links between said at least two supports is maintained.

3. The mixing system of claim 1, wherein said body comprises a hollow tube having a first end and a second end.

4. The mixing system of claim 3, wherein each of said links further comprises a first plug coupled to said first end of said body and a second plug coupled to said second end of said body, wherein said pins extend from said first plug and said second plug.

5. The mixing system of claim 1, wherein each of said at least one wraps comprises a sheet of metal circumscribing said at least two links.

6. The mixing system of claim 5, wherein said sheet of metal circumscribes three of said links.

7. The mixing system of claim 5, wherein each of said at least one wraps define an internal cavity configured to channel the exhaust stream and the air stream therein.

8. A power generation system comprising:
    a rotary machine configured to produce an exhaust stream;
    an exhaust processing system positioned to receive and process the exhaust stream;
    a duct system defining a flow path therethrough oriented to channel an air stream to said exhaust processing system and to channel the exhaust stream from said rotary machine to said exhaust processing system; and
    a mixing system positioned within said duct system, said mixing system comprising:
    a plurality of supports spaced across said flow path, wherein each of said plurality of supports comprises a hollow tube defining a plurality of holes extending through said hollow tube;
    a plurality of links extending between at least two of said supports, wherein each of said links comprises a body and two pins extending from said body, and each of said pins is sized to extend through a respective one of said plurality of holes; and
    at least one wrap circumscribing at least two of said links within said flow path, wherein said at least one wrap is oriented to change an effective direction of momentum of the exhaust stream and the air stream.

9. The power generation system of claim 8, wherein said rotary machine comprises a gas turbine engine.

10. The power generation system of claim 8, wherein said exhaust processing system comprises a selective catalytic reduction reactor.

11. The power generation system of claim 10, wherein the exhaust stream comprises nitrous oxides, said selective catalytic reduction reactor is configured to reduce a concentration of the nitrous oxide within the exhaust stream by facilitating at least one nitrous oxide reduction reaction, wherein said mixing system is configured to thermally mix the exhaust stream and the air stream to produce a mixed stream with a substantially uniform temperature profile for the at least one nitrous oxide reduction reaction.

12. The power generation system of claim 8, wherein said duct system comprises at least one wall defining at least one conduit, wherein a first end of said plurality of supports is coupled to said at least one wall, said conduit defining a portion of said flow path.

13. The power generation system of claim 8, wherein said mixing system comprises a plurality of columns arranged in a substantially linear orientation across a width of a conduit within said duct system.

14. The power generation system of claim 13, wherein said plurality of columns each comprise a plurality of supports arranged in at least one of a triangular configuration, a circular configuration, an elliptical configuration, and a parabolic configuration.

15. The power generation system of claim 14, wherein each of said at least one wraps comprises a sheet of metal circumscribing said at least two links to form a wrap section.

16. The power generation system of claim 15, wherein each of said plurality of columns comprises three wrap sections.

17. The power generation system of claim 15, wherein said sheet of metal circumscribes three of said links.

* * * * *